Patented July 8, 1924.

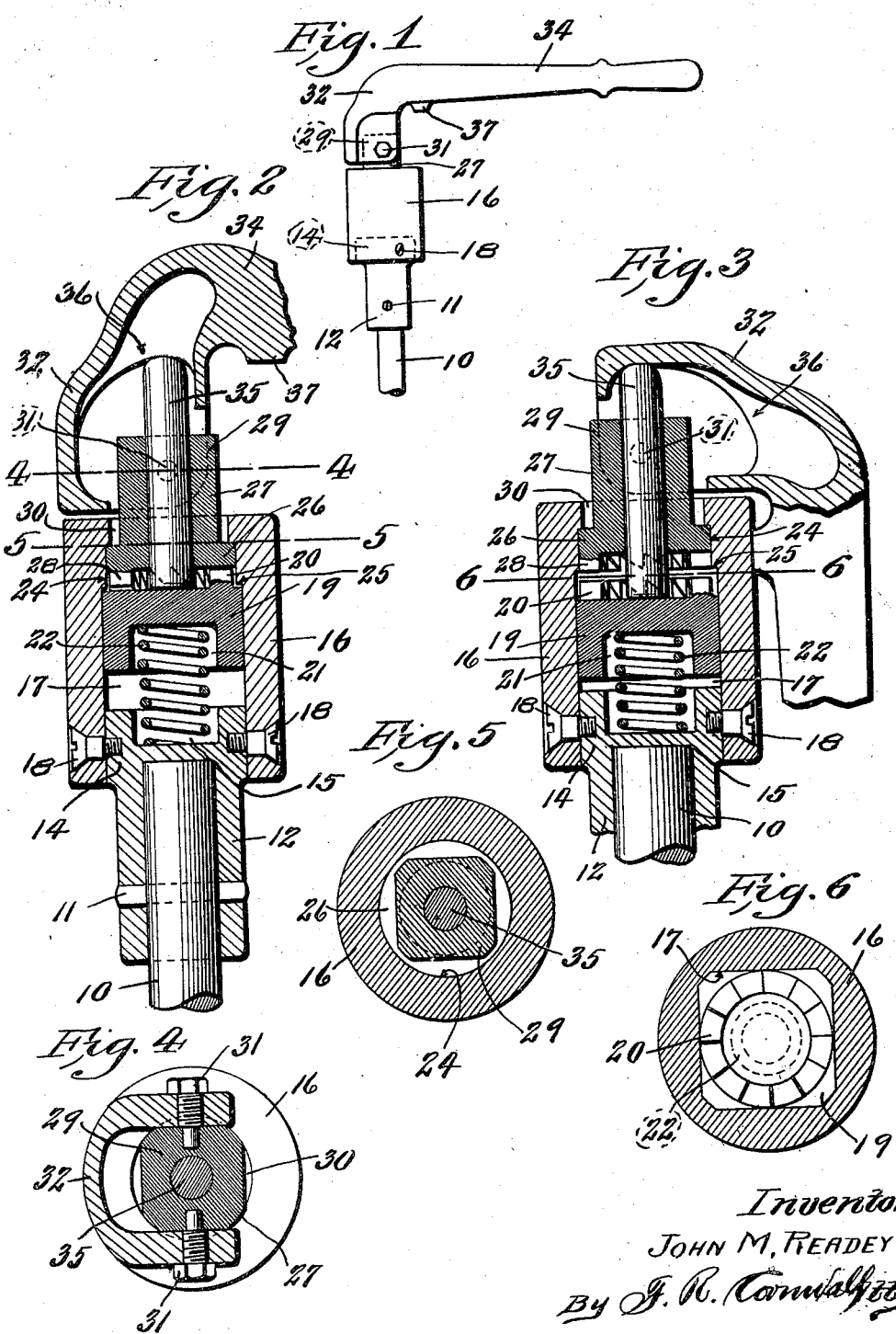

1,500,766

UNITED STATES PATENT OFFICE.

JOHN M. READEY, OF ST. LOUIS, MISSOURI.

BRAKE-HANDLE MECHANISM.

Application filed May 23, 1922. Serial No. 562,998.

*To all whom it may concern:*

Be it known that I, JOHN M. READEY, a citizen of the United States, residing at the city of St. Louis and State of Missouri, have invented a certain new and useful Improvement in Brake-Handle Mechanisms, of which the following is a full, clear, and exact description, such as will enable others skilled in the art to which it appertains to make and use the same, reference being had to the accompanying drawings, forming part of this application.

This invention relates to new and useful improvements in brake handles, and the objects of the invention are to provide simple and efficient mechanism controlled by the position of the brake handle whereby the latter is automatically engaged to or disengaged from the brake staff.

Further objects of the invention are to provide clutch mechanism whereby said handle will operate the brake shaft in one direction only and to simplify the construction of the clutch members so that they are inexpensive to manufacture and can be readily detached and replaced by new ones when broken or worn out.

With these and other objects in view my invention consists in certain novel features of construction and arrangements of parts hereinafter more fully described and claimed, and illustrated in the accompanying drawings, in which—

Figure 1 is a front elevation of the device with the brake handle in operative position.

Figure 2 is a vertical cross section through the device showing the brake handle in operative position and interlocked to the brake staff.

Figure 3 is a similar view with the brake handle in dropped or inoperative position and disengaged from the brake staff.

Figure 4 is a horizontal section taken on line 4—4 of Figure 2.

Figure 5 is a horizontal cross section taken on line 5—5 of Figure 2.

Figure 6 is a horizontal cross-section taken on line 6—6 of Figure 3.

Referring by numerals to the accompanying drawings, 10 designates a brake staff of the usual construction to the upper end of which is affixed in any suitable manner, such as by pin 11, a sleeve 12 having formed on its upper end an enlarged head 14 which is non-circular in cross section and is provided with an upwardly presented spring seat 15. This head fits into the lower end of a housing 16 which has formed therein a longitudinally disposed opening 17 which is non-circular in cross section and of substantially the same contour as the non-circular head 14. Housing 16 is detachably held in position on head 14 by means of screws 18. Movable longitudinally in the opening 17 is a clutch member 19 which is non-circular in cross section and forms a non-rotative engagement with the housing 16. This clutch member has upwardly presented ratchet teeth 20 and a downwardly presented spring seat 21 for engaging the upper end of an expansible spring 22, the lower end of which rests in spring seat 15. Non-circular opening 17 terminates a short distance from the upper end of housing 16 and communicates with a circular opening 24 and forms a downwardly disposed shoulder 25 which limits the upward movement of clutch member 19. Rotatively mounted in circular opening 24 is the lower circular end 26 of a clutch member 27, and formed on the circular end are downwardly presented ratchet teeth 28 which are designed to engage ratchet teeth 20 of member 19.

Clutch member 27 has an extension 29 which projects outwardly through a smaller circular opening 30 formed in the extreme upper end of housing 16, and pivotally mounted on this extension by means of screws 31 are the side portions of a housing 32 which latter is formed on the inner end of a brake handle 34. Clutch member 27 is formed with a longitudinally disposed opening in which is movably mounted a pin or rod 35 the lower end of which extends downwardly and rests on the upper face of clutch member 19, while its upper end projects upwardly past clutch member 27 and bears against a cam face 36 formed integral with and inwardly presented in brake handle housing 32. Brake handle 34 is provided with an abutment or projection 37 which, when said brake handle occupies a dropped position, rests against the housing 16, as shown in Figure 3.

In assembling the device, clutch member 27 is first slipped into position in housing 16 through the lower end thereof, and clutch member 19 is then placed in position in opening 17. Housing 16 is then secured to head 14 with spring 22 interposed between member 19 and head 14. Pin 35 is inserted in the opening in the clutch member 27 and brake handle 24 is then secured in position by means of screws or bolts 31.

In the operation of the device, assuming that it is desired to operate the brake staff 10, handle 34 is brought to the position shown in Figures 1 and 2. This causes the clutch members 19 and 27 to become interengaged so that by operating the handle in the proper direction, brake staff 10 will be rotated. When it is not desired to operate the brake staff, handle 34 is dropped or moved downwardly out of the way, as shown in Figure 3. This causes cam 36 to operate pin 35 and depress it so that the lower clutch member 19 is moved downwardly out of engagement with the upper clutch member 27. This clutch member 27 is now free to rotate in opening 24 and is prevented from moving downwardly by spring 22 which exerts its influence through pin 35 against housing 32 to which clutch member 27 is secured by screws 31 and is further held against downward movement by housing 32 which is positioned above the upper end of housing 16.

When it is desired to replace clutch member 19 or 27, all that is necessary is to remove screws 18, whereupon housing 16 can be detached from brake staff 10 and the broken or worn parts replaced.

A brake handle constructed in accordance with my invention is strong and durable, the operating parts thereof can be readily replaced, and when the handle is in its dropped or inoperative position, the latter is positively disengaged from the brake staff and there is no liability of the brake staff being accidentally operated.

What I claim is:

1. A brake handle mechanism comprising a brake staff housing, cooperating clutch members one of which is movable in axial direction relative to the other member mounted therein, a brake handle secured to said relatively fixed clutch member, means for maintaining said clutch members in operative relation, and means operable by said handle for disengaging said movable member from said relatively fixed member.

2. In a device of the class described, the combination with a brake staff, of a housing adapted to be detachably secured thereto, an operating member non-rotatably arranged in said housing, and movable vertically therein an operating member rotatably arranged in said housing and occupying fixed relation relative to said movable member, said rotatable member being adapted to be interlocked with said non-rotative member, and a brake handle pivotally mounted on said rotative member and adapted to control the interlocking relation of said members.

3. In a device of the class described, a brake staff housing, a brake handle, clutch mechanism arranged in said housing and adapted to interlock said brake handle to said housing, and a longitudinally movable pin operable by said handle for disabling said clutch mechanism.

4. In a device of the class described, a brake staff housing, a brake handle, clutch mechanism arranged in said housing and adapted to interlock said brake handle with said housing, a longitudinally slidable pin for disabling said clutch mechanism, and means on said brake handle engaging one end of said pin and actuating said pin whereby said clutch mechanism is controlled by the positioning of said brake handle.

5. In a brake handle mechanism, the combination with a brake staff, of a sleeve adapted to be fixed thereto, a stationary housing detachably fixed to said sleeve, a clutch member non-rotatively mounted in said housing, a co-operating clutch member rotatively arranged in said housing, means for yieldingly holding said members in operative relation, a brake handle pivotally mounted on said rotative clutch member, and a member slidably arranged in said rotative clutch member and operatively engaging said other clutch member and controlled by said handle for disengaging said clutch members.

6. A brake handle mechanism comprising a housing adapted to be secured to a brake staff, a clutch having separable members, one of said members having non-rotative engagement with said housing and movable vertically therein while the other member is rotatable therein, resilient means for maintaining said clutch members in operative engagement, a brake handle pivotally mounted on said rotatable clutch member and adapted to actuate the same, and a pin slidably arranged in said rotatable clutch member and operable by the positioning of said handle whereby said non-rotative clutch member may be moved in an engaging or disengaging relation with said rotatable clutch member.

In testimony whereof I hereunto affix my signature this 19th day of May, 1922.

JOHN M. READEY.